United States Patent
Daryani et al.

(10) Patent No.: US 11,637,806 B2
(45) Date of Patent: Apr. 25, 2023

(54) ALTERNATE CHARACTER SET DOMAIN NAME SUGGESTION AND REGISTRATION USING TRANSLATION AND/OR TRANSLITERATION

(71) Applicant: VERISIGN, INC., Reston, VA (US)

(72) Inventors: Sumit Daryani, Ashburn, VA (US);
Craig Davies, Manassas Park, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 16/886,091

(22) Filed: May 28, 2020

(65) Prior Publication Data

US 2020/0296073 A1 Sep. 17, 2020

Related U.S. Application Data

(63) Continuation of application No. 15/452,116, filed on Mar. 7, 2017, now Pat. No. 10,686,750.

(51) Int. Cl.

| | |
|---|---|
| *H04L 61/4511* | (2022.01) |
| *H04L 61/3015* | (2022.01) |
| *G06F 40/53* | (2020.01) |
| *G06F 40/58* | (2020.01) |

(Continued)

(52) U.S. Cl.
CPC ........ *H04L 61/4511* (2022.05); *G06F 40/129* (2020.01); *G06F 40/157* (2020.01);
(Continued)

(58) Field of Classification Search
CPC .......... G06F 13/00; G06F 17/27; G06F 17/28; G06F 17/289; G06F 17/2705; G06F 17/2863; G06F 17/3064; G06F 17/30672; G06F 17/30864; G06F 17/30867; G06F 40/53; G06F 40/58; G06F 40/129; G06F 40/157; G06F 40/205; G06Q 30/02; H04L 29/06; H04L 29/12; H04L 29/08072; H04L 29/12009; H04L 29/12066; H04L 61/302; H04L 61/1511; H04L 61/3025; H04L 61/3035; H04L 67/02; H04L 67/00
(Continued)

(56) References Cited

U.S. PATENT DOCUMENTS

| | | | |
|---|---|---|---|
| 9,787,634 B1 | 10/2017 | Lai et al. | |
| 2002/0065903 A1* | 5/2002 | Fellman | ................. H04L 61/30 709/220 |

(Continued)

OTHER PUBLICATIONS

Extended European Search Report dated Jul. 6, 2018, EP Application No. 18160560, filed Mar. 7, 2018, pp. 1-8.

*Primary Examiner* — Jeffrey R Swearingen
(74) *Attorney, Agent, or Firm* — McCarter & English, LLP; Michael A. Sartori

(57) ABSTRACT

Some embodiments provide domain name suggestions based on a user-provided ASCII phrase translated and/or transliterated into any of a number of supported non-English language character sets. To suggest non-English-language domain names, some embodiments parse, translate, and transliterate the user-provided ASCII names into domain names that include at least one non-English language character. Moreover, some embodiments determine the DNS registration status (e.g., as a second-level domain) of the Punycode (in ASCII) corresponding to these non-English domain names and provide the user with the ability to register any that are unregistered.

20 Claims, 5 Drawing Sheets

(51) Int. Cl.
*G06F 40/129* (2020.01)
*G06F 40/157* (2020.01)
*G06F 40/205* (2020.01)
*H04L 101/32* (2022.01)

(52) U.S. Cl.
CPC ............ *G06F 40/205* (2020.01); *G06F 40/53* (2020.01); *G06F 40/58* (2020.01); *H04L 61/302* (2013.01); *H04L 61/3025* (2013.01); *H04L 2101/32* (2022.05)

(58) Field of Classification Search
USPC .......................................... 707/767; 709/245
See application file for complete search history.

(56) References Cited

U.S. PATENT DOCUMENTS

| | | |
|---|---|---|
| 2002/0103820 A1 | 8/2002 | Carliell et al. |
| 2004/0199520 A1* | 10/2004 | Ruiz ................... G06Q 50/10 |
| 2012/0096019 A1 | 4/2012 | Manickam et al. |
| 2012/0330990 A1* | 12/2012 | Chen ................... G06F 16/3322 |
| | | 707/761 |
| 2013/0173701 A1* | 7/2013 | Goyal ................... H04L 61/302 |
| | | 382/218 |
| 2013/0238310 A1* | 9/2013 | Viswanathan ......... G06F 40/284 |
| | | 704/2 |
| 2014/0095143 A1* | 4/2014 | Jan ........................ G06F 40/163 |
| | | 704/2 |
| 2014/0100845 A1 | 4/2014 | Hoskinson et al. |
| 2014/0143331 A1 | 5/2014 | Smith et al. |
| 2014/0163952 A1 | 6/2014 | Brawer et al. |
| 2015/0154294 A1 | 6/2015 | Kamdar et al. |
| 2016/0055490 A1* | 2/2016 | Keren ................... G06Q 30/00 |
| | | 705/14.47 |
| 2016/0196300 A1* | 7/2016 | Kamdar ................ H04L 61/302 |
| | | 707/770 |
| 2016/0241510 A1 | 8/2016 | Kamdar et al. |
| 2017/0351953 A1 | 12/2017 | Raemy et al. |
| 2018/0211320 A1* | 7/2018 | Kamdar ................ G06Q 40/06 |

* cited by examiner

| Unicode | Punycode | VCards | Name Servers | Events | Status |
|---|---|---|---|---|---|
| ευτυχισμένοςvατιοv.com | xn--ixaikqcpiacqd4behjfb0b.com | [Fig. 4, 400] | ns1.hb.com | Registration date: 2015-06-29T01:11:12Z, Last changed: 2016-06-29T09:31:54Z | Registered, renew prohibited |
| χάππυέθvoς.net | xn--hxac7aukca2anq.net | [Fig. 5, 500] | ns1.sba.com, ns2.sba.com | Registration date: 2015-06-29T01:11:12Z, last changed: 2016-06-29T09:31:54Z | Registered, transfer prohibited |
| χάππυvατιοv.com | xn--hxakyoclda2bhs.com | n/a | n/a | n/a | Available |

```
role: Registrar
name: Domains Inc.
adr: 123 Somewhere St, Scottsdale, AZ, United States of America
tel: +1-480-624-2546
email: domains@domainsinc.com
role: Registrant
name: XYZ Corp.
adr: 111 Abc Lane, Rochester, NY, United States of America
tel: +1-585-555-1234
role: Administrative
name: John Doe
email: dns-admin@xyzcorp.com
```

```
role: Registrar
name: SBA Domains
adr: 2121 park street, Seattle, WA, United States of America
role: Registrant
name: Nation One Corporation
adr: 1 Maple Ave, Reston, VA, United States of America
tel: +1-703-111-1111
email: corp@nationone.net
```

ALTERNATE CHARACTER SET DOMAIN NAME SUGGESTION AND REGISTRATION USING TRANSLATION AND/OR TRANSLITERATION

RELATED APPLICATION

This application is a continuation of U.S. Pat. No. 10,686,750, entitled "Alternate Character Set Domain Name Suggestion and Registration" and filed on Mar. 7, 2017, which is hereby incorporated by reference in its entirety.

FIELD

This disclosure relates generally to registering internet domain names.

BACKGROUND

In the internet Domain Name System (DNS), domain names may be registered to registrants by registrars, who act as intermediaries between the registrant and a master registry. Currently, only domain names that are restricted to American Standard Code for Information Exchange (ASCII) characters can be registered. However, some web browsers can render and interpret non-English-character domain names, e.g., using Unicode characters or Punycode characters encoded by ASCII characters. That is, some web browsers can accept and process non-English character domain names (e.g., by decoding ASCII Punycode representations or by directly rendering Unicode characters) in their address bar field. Accordingly, a gap exists between non-English character domain name registration and non-English character domain name usage. Potential domain name registrants need an easy way to find domains in their native (non-English) language, check their availability status, obtain contact information if they are registered, and register them if they are unregistered.

SUMMARY

According to various embodiments, a computer-implemented method of providing suggested domain names and their registration statuses is provided. The method includes providing a network interface communicatively coupled to the internet; receiving at the network interface an input string provided by a user; receiving at the network interface a language selection provided by the user; parsing, by an electronic processor, the input string into a plurality of words; translating, by an electronic processor, each of the plurality of words into a language specified by the language selection, such that a plurality of translated words are produced; transliterating, by an electronic processor, each of the plurality of words into the language specified by the language selection, such that a plurality of transliterated words are produced; generating, by at electronic processor, a plurality of combinations of multiple words, each combination of multiple words of the plurality of combinations of multiple words including words selected from at least one of the plurality of translated words and the plurality of transliterated words; generating, by at least one electronic processor, a Punycode representation of at least a selected one of the plurality of combinations of multiple words; determining a domain name system (DNS) registration status of a domain name including the Punycode representation; and providing to the user, by the network interface, the domain name including the Punycode representation and a DNS registration status of the domain name including the Punycode representation.

Various optional features of the above embodiments include the following. The DNS registration status may indicate that the domain name including the Punycode representation is not registered. The method may include registering the domain name including the Punycode representation to the user. The input string may consist of American Standard Code for Information Interchange (ASCII) characters. The network interface may include a representational state transfer (REST) interface. The language selection may include a language that includes a plurality of non-English characters in its alphabet. The combination of multiple words may include words selected from both the plurality of translated words and the plurality of transliterated words. The DNS registration status indicates that the domain name including the Punycode representation may be registered, and the method may further include providing to the user, by the network interface, an identity of a registrant of the domain name including the Punycode representation. The method may further include providing to the user, by the network interface, an expiration date of a DNS registration of the domain name including the Punycode representation. At least the selected one of the plurality of combinations of multiple words may include at least one of the plurality of translated words and at least one of the plurality of transliterated words, where the Punycode representation includes a representation of the at least one of the plurality of translated words and the at least one of the plurality of transliterated words.

According to various embodiments, a system for providing suggested domain names and their registration statuses is provided. The system includes a network interface communicatively coupled to the internet, the network interface configured to receive an input string provided by a user and receive a language selection provided by the user; and at least one electronic processor configured to: parse the input string into a plurality of words; translate each of the plurality of words into a language specified by the language selection, such that a plurality of translated words are produced; transliterate each of the plurality of words into the language specified by the language selection, such that a plurality of transliterated words are produced; generate a plurality of combinations of multiple words, each combination of multiple words of the plurality of combinations of multiple words including words selected from at least one of the plurality of translated words and the plurality of transliterated words; generate a Punycode representation of at least a selected one of the plurality of combinations of multiple words; and determine a domain name system (DNS) registration status of a domain name including the Punycode representation; where the network interface is further configured to provide to the user the domain name including the Punycode representation and a DNS registration status of the domain name including the Punycode representation.

Various optional features of the above embodiments include the following. The DNS registration status may indicate that the domain name including the Punycode representation is not registered. The network interface may be further configured to register domain name including the Punycode representation to the user. The input string may consist of American Standard Code for Information Interchange (ASCII) characters. The network interface may include a representational state transfer (REST) interface. The language selection may include language that includes a plurality of non-English characters in its alphabet. The combination of multiple words may include words selected from both the plurality of translated words and the plurality of transliterated words. The DNS registration status may indicate that the domain name including the Punycode representation is registered, where the network interface is further configured to provide to the user an identity of a registrant of the domain name including the Punycode representation. The network interface may be further configured to provide to the user an expiration date of a DNS registration of the domain name including the Punycode representation. At least the selected one of the plurality of combinations of multiple words may include at least one of the plurality of translated words and at least one of the plurality of transliterated words, where the Punycode representation includes a representation of the at least one of the plurality of translated words and the at least one of the plurality of transliterated words.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3 illustrates a table depicting an example partial output according to some embodiments;

FIG. 4 illustrates a table depicting a VCard portion of the example output of FIG. 3 according to some embodiments; and FIG. 5 illustrates a table depicting a VCard portion of the example output of FIG. 3 according to some embodiments.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide domain name suggestions based on a user-provided ASCII phrase translated and/or transliterated into any of a number of supported non-English language character sets. Such embodiments may provide a Representational State Transfer (REST) Application Program Interface (API) and/or user interface to allow users to input an ASCII phrase and choice of language. Further, some embodiments utilize Registration Data Access Protocol (RDAP) directories to determine the registration status of the suggested domain names.

To suggest non-English-language domain names, some embodiments parse, translate, and transliterate the user-provided ASCII names into domain names that include at least one non-English language character. Moreover, some embodiments determine the DNS registration status (e.g., as a second-level domain) of the Punycode (in ASCII) corresponding to these non-English domain names. Thus, some embodiments provide users with suggestions options for registering non-English-language domain names, and some embodiments can affect the registration upon user authorization. Some embodiments also provide users with registration information such as contacts, date renewal, and name server identification, particularly, though not exclusively, for currently-registered names. These and other embodiments are described in detail herein.

Figure 1:
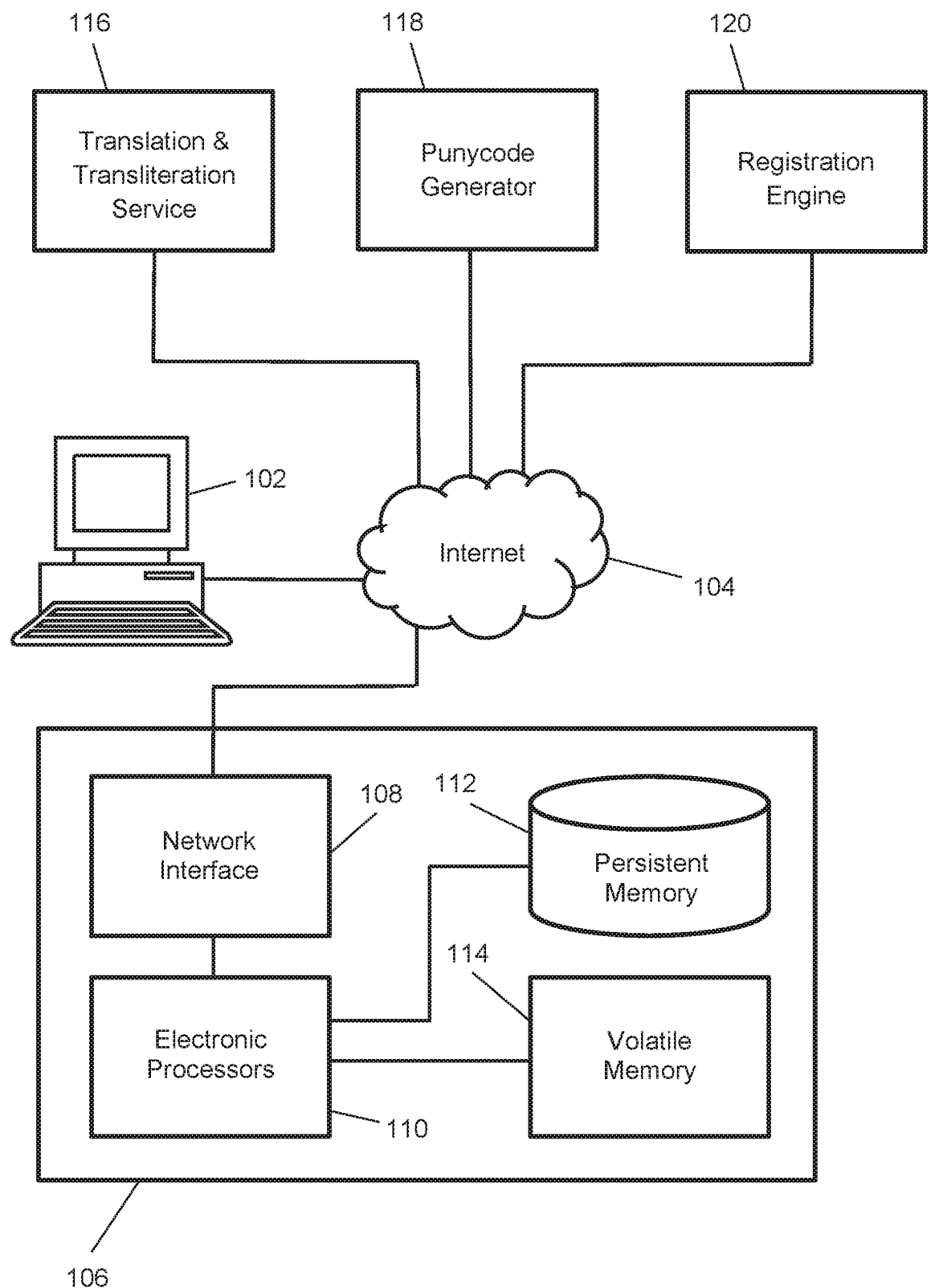
FIG. 1 is a schematic diagram of a system according to some embodiments.

FIG. 1 is a schematic diagram of a system according to some embodiments. The system may be based around an electronic hardware internet server computer 106, which may be communicatively coupled to a network such as the internet 104. Server computer 106 includes network interface 108 to affect the communicative coupling to the internet 104. Network interface 108 may include a physical network interface, such as a network adapter. Server computer 108 may be a special-purpose computer, adapted for reliability and high-bandwidth communications. Thus, server computer 108 may be embodied in a cluster of individual hardware server computers, for example. Alternately, or in addition, server computer 108 may include redundant power supplies. Persistent memory 112 may be in a Redundant Array of Inexpensive Disk drives (RAID) configuration for added reliability, and volatile memory 114 may be or include Error-Correcting Code (ECC) memory hardware devices. Server computer 108 may further include one or more electronic processors 110, which may be multi-core processors suitable for handling large amounts of information. Electronic processors 110 are communicatively coupled to persistent memory 112, and may execute instructions stored thereon to effectuate the techniques disclosed herein, e.g., as shown and described in reference to FIG. 2.

Server computer 106 is communicatively coupled to, or in some embodiments includes, translation and transliteration service 116, Punycode generator 118, and registration engine 120. Thus, as depicted in FIG. 1, translation and transliteration service 116, Punycode generator 118, and registration engine 120 are coupled to server computer 106 through the internet. However, in other embodiments, any, or a combination, of translation and transliteration service 116, Punycode generator 118, and registration engine 120 can be included on the same premises as server computer 106, or within the same computer hardware as server computer 106. When coupled to server computer 106 through the internet 104, translation and transliteration service 116, Punycode generator 118, and registration engine 120 can each be implemented as server computers having similar hardware properties to server computer 106. Any or each of translation and transliteration service 116, Punycode generator 118, and registration engine 120 may be implemented using APIs to handle the messaging between themselves as servers and client computers.

Translation and transliteration service 116 receives character strings (e.g., words in ASCII) and a language selection from a client computer, and serves translations and transliterations of the received strings into the selected language. Translation and transliteration service 116 may be embodied as a single service or as separate translation and transliteration services. Whether unitary or separate, translation and transliteration service 116 may serve translations and transliterations serially or in parallel. Translation and transliteration service 116 may serve the translations and transliterations in Unicode, Punycode, or both. "Translation" as used herein means returning a word in the selected language that has the same meaning as the received word. For example, the Greek translation of "nation" is "έθνος", because the meaning of "έθνος" is "nation". "Transliteration" as used herein means returning a string of characters in the selected language that each correspond to the characters of the received word. The correspondence may be that the characters are pronounced alike or similarly. The correspondence may be one-to-one or m-to-n, where either or both of m and n are greater than one (e.g., in the case of dipthongs). As example of a one-to-one correspondence, the Greek transliteration of "nation" is "νατιov", because each letter in "nation" has a corresponding character in "νατιov" with an identical or similar sound.

Translation and transliteration service 116 may include an electronically stored set of foreign-language dictionaries, e.g., a set of database tables that each include English and corresponding foreign language words, one table per foreign language. To serve a translation, transliteration and translation service 116 may use the input word as a database key for the table that corresponds to the selected language to retrieve the corresponding foreign-language word. The corresponding foreign-language word is then served to the requesting client, e.g., in Unicode, Punycode, or both.

Translation and transliteration service 116 may include an electronically stored set of character correspondences, e.g., as a set of database tables that include the English language alphabet in correspondence with characters in the respective foreign language. To serve a transliteration, translation and transliteration service 116 may parse the input word into individual English letters (or phonemes), and then use the letters (or phonemes) as database keys for the table that corresponds to the selected language to retrieve the corresponding individual (or multiple) characters. Translation and transliteration service 116 may integrate the resulting foreign-language characters into a foreign-language string in Unicode, Punycode or both, and serve the string to the requesting client computer.

Punycode generator 118 may be used in embodiments in which translation and transliteration service 116 serves strings in Unicode but not Punycode. In such embodiments, server computer 106 may receive Unicode translation and/or transliteration strings from translation and transliteration service 116, send them to Punycode generator 118, and receive corresponding Punycode representations of the strings served by Punycode generator 118.

Registration engine 120 may be a Registration Data Access Protocol (RDAP) compliant server. Such an RDAP-compliant server receives Hypertext Transfer Protocol (HTTP) requests and returns responses in JavaScript Object Notation (JSON) according to a REST protocol. In particular, registration engine 120 receives a domain name (typically second-level or higher) and serves DNS registration information for the received domain name. Served information includes, for example, registration status, and, for currently-registered domain names, registration expiration, point of contact information, organization identifier, and name servers.

Also depicted in FIG. 1 is client computer 102. Client computer 102 may be a desktop, laptop, tablet, or smartphone, for example. Client computer 102 is communicatively coupled to the internet 104, and, therefore, to server computer 106. Client computer 102 may send queries to server computer 106 to receive non-English-language domain name information as disclosed herein, e.g., as shown and described in reference to FIG. 2, below.

Figure 2:
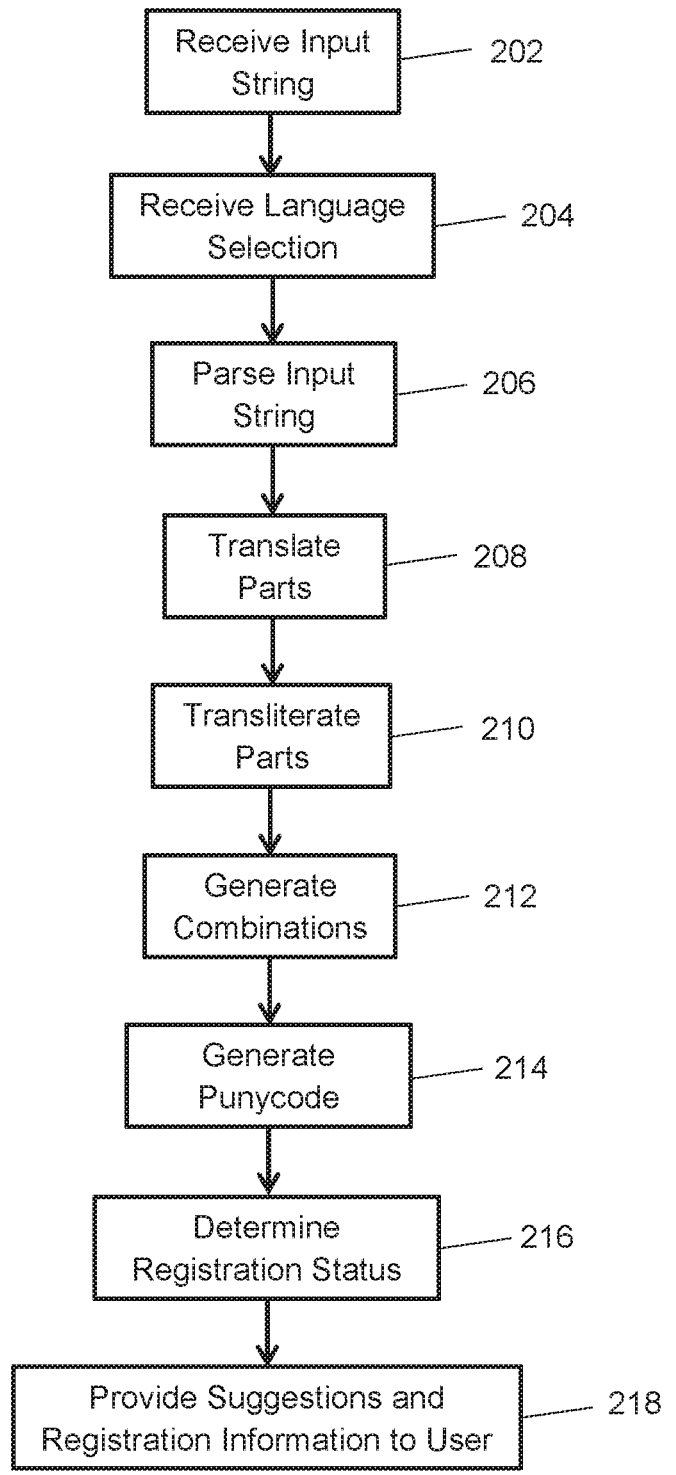
FIG. 2 is a flowchart of a method according to some embodiments.

FIG. 2 is a flowchart of a method according to some embodiments. The method of FIG. 2 may be practiced using the hardware and software shown and described in reference to FIG. 1, above. In particular, the steps of FIG. 2 are phrased from the viewpoint of server computer 106 interacting with client computer 102. Such a client computer may be operated by a person wishing to register a domain name in language that uses a non-English alphabet. Such languages include, by way of non-limiting example, Greek, Hindi, Urdu, Thai, Russian, Armenian, Arabic, Persian, Bengali, Turkish, and Asian languages (e.g., Chinese, Japanese, Vietnamese, Korean, etc.). Essentially any language that uses characters that do not appear in the English-language alphabet is contemplated.

At block 202, server computer 106 receives an input string from client computer 102 via internet 104. Client computer 102 may send the input string to server computer 116 using an API and/or user interface provided by server computer 106. For example, a user of client computer 102 may enter the string in a graphical user interface on a web page provided by, or otherwise in communication with, server computer 106. The web page may provide the input string to server computer 106 via the API. The input string may be a string of words in ASCII text, for example. The input string may or may not include spaces or other delimiters between its constituent words.

At block 204, server computer 106 receives a language selection from client computer 102. The language selection may accompany the input string received at block 202, or may be received separately. Similar to the input string, client computer 102 may send the language selection to server computer 116 using an API and/or user interface provided by server computer 106. For example, a user of client computer 102 may select the language using a graphical user interface (e.g., radio buttons, a drop-down menu, etc.) on a web page provided by, or otherwise in communication with, server computer 106, and the web page may send the selection to sever computer 106 using an API. The language selection may be of any supported language, by way of non-limiting example, Greek, Hindi, Urdu, Thai, Russian, Armenian, Arabic, Persian, Bengali, Turkish, and Asian languages (e.g., Chinese, Japanese, Vietnamese, Korean, etc.). Any language that does not use the same characters as English is contemplated. The language selection is intended to be for a domain name that the user of client computer 102 wishes to investigate and may wish to register. As detailed herein, server computer 106 constructs potential domain names for presentation to, and possibly registration by, the person.

At block 206, server computer 106 parses the input string received at block 202. If the input string includes spaces or other delimiters between words, then server computer 106 may parse the words accordingly, i.e., breaking the string at the delimiters. Otherwise, server computer 106 may utilize a different parsing technique. For example, server computer 106 may use an English-language dictionary, e.g., stored locally or remotely as a table in an electronic database, to progressively match initial segments of the string until no further match is obtained, at which point the initial segment is parsed out and the process returns to the remainder of the string, if any. Other parsing techniques are contemplated in the alternative. Essentially any technique that accepts and partitions a string of characters into its constituent parts, where each part is a word, is suitable. In more detail, any technique that accepts a string of characters and returns a plurality of disjoint substrings of characters, each substring a word, such that the join of the substrings is the original string of characters, is acceptable. The returned substrings/parts may be returned as a single string with known delimiters between words, in a data structure that inherently separates the substrings, or using any other technique that keeps the substrings/parts separate.

Note that some embodiments may utilize a web service or other technique for the parsing of block 206. In other words, the system of FIG. 1 may include a remote parsing service communicatively coupled to the internet, as with translation and transliteration service 116, Punycode generator 118, and registration engine 120.

At block 208, the technique translates the parts produced by the partitioning of the input string per block 206. The translation is into the language(s) selected per block 204. The translation may be accomplished by translation and transliteration service 116 of FIG. 1, for example. The translations may be returned to server 106 using an API, for example, in embodiments that utilize a remote translation and transliteration service as shown in FIG. 1. The translations may be represented in Unicode or Punycode.

At block 210, the technique transliterates the parts produced by the partitioning of the input string according to block 206. The transliteration is into the language(s) selected per block 204. The transliteration may be accomplished by translation and transliteration service 116 of FIG. 1, for example. The transliterations may be returned to server 106 using an API, for example, in embodiments that utilize a remote translation and transliteration service as depicted in FIG. 1. The transliterations may be represented in Unicode or Punycode.

At block 212, the technique generates combinations of the translations and transliterations received at blocks 208 and 210, respectively. That is, the technique generates multiple output strings corresponding to the input string received at block 202, where each of the multiple output strings replaces at least one of the words in the input string received at block 202 with either a corresponding translation or a corresponding transliteration. In some embodiments, block 212 outputs all possible output string combinations that result from substituting at least one of the constituent words of the input string with a corresponding translation or transliteration.

For example, an input string received at block 202 may be "happynation" and the language selection received at block 204 may be Greek. The parsing of block 206 breaks the input string into its constituent substrings, i.e., parts, which may be represented here (using a space as a delimiter character) as "happy nation". These parts may be individually translated per block 208 into, respectively, "ευτυχισμένος" and "έθνος". The same parts may be individually transliterated into "χάππυ" and "νατιov", respectively, at block 210. Block 202 produces every combination that results from replacing one or both of "happy" and "nation" with a corresponding translation or transliteration. Table 1 below depicts such combinations.

TABLE 1

| | Explanation | |
| --- | --- | --- |
| Output String | First Word | Second Word |
| ευτυχισμένοςnation | Translated | Unchanged |
| happyέθνος | Unchanged | Translated |
| ευτυχισμένοςέθνος | Translated | Translated |
| χάππυnation | Transliterated | Unchanged |
| happyνατιov | Unchanged | Transliterated |
| χάππυνατιov | Transliterated | Transliterated |
| ευτυχισμένοςνατιov | Translated | Transliterated |
| χάππυέθνος | Transliterated | Translated |

The technique of block 212 may output the combinations in any suitable format, e.g., as a string with predetermined delimiters, as a list, or as any other data structure that preserves the individual combination strings. Further, the strings may be output in Unicode or Punycode, depending on whether translation and transliteration service 116 produces outputs in Unicode or Punycode.

At block 214, the technique generates Punycode for the combinations output by block 212 if they are not already in Punycode. To that end, the technique may utilize Punycode generator 118 of FIG. 1. The Punycode may be returned to server 106 using an API, for example, in embodiments that utilize a remote Punycode generator as depicted in FIG. 1. Block 214 may output the combinations in any suitable format, e.g., as a string with predetermined delimiters, as a list, or in any other data structure that preserves the individual combination Punycode strings. Note that the generated Punycode is entirely in ASCII, therefore, registerable in the DNS as a second-level domain, for example.

At block 216, the technique determines the registration status of various second-level domains corresponding to the combination Punycode strings provided by block 214. The registration status determination may be accomplished by registration engine 120 of FIG. 1, for example. Registration engine 120 may receive from server computer 106 domain names generated from the combination Punycode strings of block 214 in Hypertext Transfer Protocol (HTTP) requests and return responses that include registration status and other registration information in JavaScript Object Notation (JSON) according to a REST protocol.

Note that the technique may determine the registration status of the combination Punycode strings as second-level domains for a variety of top-level domains. For example, the technique may determine the registration status of: [Punycode combination string].com, [Punycode combination string].net, [Punycode combination string].tv, [Punycode combination string].org, [Punycode combination string].int, [Punycode combination string].edu, [Punycode combination string].gov, [Punycode combination string].mil, or for [Punycode combination string] as the second-level domain combined with any country code top-level domain. Any other top-level domains are also contemplated. The particular top-level domains utilized in specific embodiments may depend on the top-level domains that are handled by registration engine 120.

At block 218, server computer 106 provides suggested domains and their registration status to client computer 102. The providing may be through a web page provided by, or otherwise in communication with, server computer 106, e.g., the same web page into which the user provided an input string. Alternately, or in addition, the suggestions and other information may be emailed to the user, or communicated using any of a variety of communication channels. The domains and their registration status may be presented in a table, for example.

FIG. 3 illustrates table 300 depicting an example of a partial output by server computer 106 to client computer 102 for the input string "happynation" and the language selection of Greek. A complete output may list every second-level domain that appears in Table 1 along with a variety of first-level domains (e.g., .com, .net, etc.). That is, a complete output may exhaustively list the statuses of every Punycode second-level domain as appearing in Table 1 joined to every top-level domain (or a selection thereof, e.g., .com, .net, etc.). Note that table 300 depicts two registered domains and one unregistered domain. An interested user may contact the registrants of the registered domains using the provided contact information in order to attempt to acquire the registered domains, for example. A user may proceed to register the unregistered domain.

FIGS. 4 and 5 illustrate tables depicting VCard portions of the example output of FIG. 3, according to some embodiments. In particular, as depicted in FIG. 3, the two registered domain names, ευτυχισμένοςναtiov.com and χαtττtυέθνος.net, are depicted as having associated VCards. These VCards are represented as, respectively, FIG. 4, VCard 400, and FIG. 5, VCard 500. In some embodiments, the output data is formatted as depicted in FIG. 3, with VCards embedded therein; in other embodiments, the VCards may be separately conveyed.

Some embodiments provide the user with the ability to register any unregistered domains (e.g., "χαtττtυνατiov.com" as appearing in FIG. 3) directly within the system. For example, some embodiments provide a user interface through which a user of client computer 102 may register any suggested unregistered domains. The user interface may accept contact and other information (e.g., name server identification), as well as payment information, and register any selected unregistered suggested Punycode domain names. In some embodiments, the suggestions are presented in a table similar to table 300 of FIG. 3, except that the table includes a column of buttons that a user may activate for unregistered domains in order to initiate the registration process. The registration process may be completed on the same web page using an additional interface configured to accept the necessary registration information (contact information, payment information, etc.). Such buttons may be "greyed out" in rows corresponding to registered domains.

Note that the blocks of FIG. 2 may be performed in any sensible order. For example, the actions of blocks 208 and 210 may be interchanged or merged in various embodiments.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of suggesting a domain name, the method comprising:

receiving, over a computer network, an input string provided by a user, wherein the input string is in a first format;

determining a language for the user;

parsing, by an electronic processor, the input string into a plurality of terms;

at least one or both of translating or transliterating, by the electronic processor, at least one term of the plurality of terms, wherein translating at least one term of the plurality of terms comprises translating at least one term of the plurality of terms into a translated term in the language, wherein transliterating at least one term of the plurality of terms comprises transliterating at least one term of the plurality of terms into a transliterated term in the language;

generating, by the electronic processor, a representation of a combination of multiple terms, wherein the multiple terms include at least one or both of: the translated term or the transliterated term, wherein the representation of the combination of multiple terms is in a second format;

determining, based on the representation of the combination of multiple terms in the second format, a registration status of at least one domain name of a plurality of domain names; and providing to the user, over the computer network, the at least one domain name as a suggested domain name, wherein the suggested domain name is from the plurality of domain names, wherein the suggested domain name is registerable by the user, wherein the suggested domain name is provided to the user in the first format and registerable in the second format.

2. The method of claim 1, wherein determining the language for the user comprises receiving, over the computer network, a language selection provided by the user.

3. The method of claim 1, wherein the representation of the combination of multiple terms comprises a Punycode representation.

4. The method of claim 3, wherein determining the registration status of the plurality of domain names comprises:

determining the registration status of the plurality of domain names based on the Punycode representation.

5. The method of claim 4, wherein the registration status indicates that the suggested domain name is not registered.

6. The method of claim 4, wherein the registration status indicates that the suggested domain name is registered, the method further comprising:

providing, to the user, contact information of a registrant of the suggested domain name.

7. The method of claim 1, wherein the input string consists of non-space delimited characters, wherein the characters comprise American Standard Code for Information Interchange (ASCII) characters.

8. The method of claim 1, wherein the receiving the input string comprises receiving the input string over a representational state transfer (REST) interface.

9. The method of claim 1, wherein the language comprises a language that includes a non-English character.

10. The method of claim 1, wherein the multiple terms include the translated term and the transliterated term.

11. A system for suggesting a domain name, the system comprising:

an interface communicatively coupled to the internet, the interface configured to receive an input string provided by a user, wherein the input string is in a first format; and an electronic processor operable to perform operations comprising:

determining a language for the user;

parsing the input string into a plurality of terms;

at least one or both of translating or transliterating at least one term of the plurality of terms, wherein translating at least one term of the plurality of terms comprises translating at least one term of the plurality of terms into a translated term in the language, wherein transliterating at least one term of the plurality of terms comprises transliterating at least one term of the plurality of terms into a transliterated term in the language;

generating a representation of a combination of multiple terms, wherein the multiple terms include at least one or both of: the translated term or the transliterated term, wherein the representation of the combination of multiple terms is in a second format;

determining, based on the representation of the combination of multiple terms in the second format, a registration status of at least one domain name of a plurality of domain names; and providing to the user a suggested domain name, the at least one domain name as wherein the suggested domain name is from the plurality of domain names, wherein the suggested domain name is registerable by the user, wherein the suggested domain name is provided to the user in the first format and registerable in the second format.

12. The system of claim 11, wherein determining the language for the user comprises receiving a language selection provided by the user.

13. The system of claim 11, wherein the representation of the combination of multiple terms comprises a Punycode representation.

14. The system of claim 13, wherein
determining the registration status of the plurality of domain names comprises: determining the registration status of the plurality of domain names based on the Punycode representation.

15. The system of claim 14, wherein the registration status indicates that the suggested domain name is not registered.

16. The system of claim 14, wherein the registration status indicates that the suggested domain name is registered, and wherein the operations further comprise:

providing, to the user, contact information of a registrant of the suggested domain name.

17. The system of claim 11, wherein the input string consists of American Standard Code for Information Interchange (ASCII) characters.

18. The system of claim 11, wherein the interface comprises a representational state transfer (REST) interface.

19. The system of claim 11, wherein the language comprises a language that includes a non-English character.

20. The system of claim 11, wherein the multiple terms include the translated term and the transliterated term.

* * * * *